US011531212B2

(12) United States Patent
Palmer et al.

(10) Patent No.: US 11,531,212 B2
(45) Date of Patent: Dec. 20, 2022

(54) STEREOSCOPIC 3D SYSTEM USING LINEAR POLARIZATION

(71) Applicants: Volfoni R&D, Villeneuve-Loubet (FR); Shenzhen Timewaying Technology Co., Ltd, Shenzhen (CN)

(72) Inventors: Stephen Palmer, Borlänge (SE); Bertrand Caillaud, La Gaude (FR); YanLong Li, ShenZhen (CN)

(73) Assignees: Volfoni R&D; Shenzhen Timewaying Technology Co., Ltd.

( * ) Notice: Subject to any disclaimer, the term of this patent is extended or adjusted under 35 U.S.C. 154(b) by 1 day.

(21) Appl. No.: 17/100,131

(22) Filed: Nov. 20, 2020

(65) Prior Publication Data
US 2021/0157163 A1    May 27, 2021

Related U.S. Application Data

(60) Provisional application No. 62/938,767, filed on Nov. 21, 2019.

(51) Int. Cl.
*G02B 30/25* (2020.01)
*G02B 30/24* (2020.01)
(Continued)

(52) U.S. Cl.
CPC .......... *G02B 30/25* (2020.01); *G02B 27/283* (2013.01); *G02B 30/24* (2020.01); *G02C 7/12* (2013.01);
(Continued)

(58) Field of Classification Search
CPC ...... G02B 30/25; G02B 30/24; G02B 27/283; G02C 7/12; G02F 1/13363; G02F 1/1337;
(Continued)

(56) References Cited

U.S. PATENT DOCUMENTS 4,792,850 A   12/1988   Liptoh et al.
7,528,906 B2   5/2009   Robinson et al.
(Continued)

OTHER PUBLICATIONS

International Searching Authority/EP, International Search Report and Written Opinion of the International Searching Authority, Application No. PCT/IB2020/000977, dated Apr. 19, 2021, 14 pages.

*Primary Examiner* — Nathanael R Briggs
(74) *Attorney, Agent, or Firm* — Sunstein LLP

(57) ABSTRACT

Stereoscopic 3D systems include a conversion system having a polarization beam-splitting element to separate a randomly polarized incident image-beam into one transmitted image-beam and at least one reflected image-beam, first and second polarization modulators arranged to modulate states of the transmitted and reflected image-beams between first and second output linear polarization states, the modulators including first and second pi-cell liquid crystal elements aligned in mutually crossed orientation and switched between first and second optical-states, one of the optical-states having in-plane optical retardation corresponding to a quarter-wave plate (QWP), an additional QWP proximate to one of the pi-cell liquid crystal elements and perpendicularly aligned to the optical axis for the in-plane optical retardation for one of the pi-cell liquid crystal elements. Passive linear polarized viewing-glasses include first and second lenses, each having a mutually parallel linear polarizer, and a half-wave plate located proximate the input surface for one of the lenses.

19 Claims, 6 Drawing Sheets

(51) Int. Cl.
  *G02B 27/28* (2006.01)
  *G02C 7/12* (2006.01)
  *G02F 1/13363* (2006.01)
  *G02F 1/1337* (2006.01)
  *G02F 1/139* (2006.01)

(52) U.S. Cl.
  CPC .......... *G02F 1/1337* (2013.01); *G02F 1/1395* (2013.01); *G02F 1/13363* (2013.01); *G02F 1/133638* (2021.01); *G02F 2413/01* (2013.01); *G02F 2413/05* (2013.01)

(58) Field of Classification Search
  CPC ............. G02F 1/1395; G02F 1/133638; G02F 2413/01; G02F 2413/05
  See application file for complete search history.

(56) References Cited

U.S. PATENT DOCUMENTS

| | | |
|---|---|---|
| 7,760,157 B2 | 7/2010 | Cowan et al. |
| 7,857,455 B2 | 12/2010 | Cowan et al. |
| 8,220,934 B2 | 7/2012 | Schuck et al. |
| 9,594,255 B2 | 3/2017 | Palmer |
| 9,740,017 B2 | 8/2017 | Hoang et al. |
| 9,958,697 B2 | 5/2018 | Lee et al. |
| 2010/0238546 A1* | 9/2010 | Hsu ........................ G02B 30/25 359/465 |
| 2016/0266428 A1* | 9/2016 | Li ...................... G02F 1/133308 |
| 2016/0381352 A1* | 12/2016 | Palmer ................. H04N 13/363 349/8 |

* cited by examiner

Fig. 1 (prior-art)

Fig. 2 (prior-art)

Fig. 3 (prior-art)

STEREOSCOPIC 3D SYSTEM USING LINEAR POLARIZATION

CROSS-REFERENCE TO RELATED APPLICATION

This application claims the benefit of priority to U.S. Provisional Application No. 62/938,767, filed Nov. 21, 2019, which is incorporated herein by reference.

FIELD OF INVENTION

The present invention relates to a stereoscopic three-dimensional (3D) system using linear polarization, and more specifically to a polarization conversion system for the displaying of time-multiplexed stereoscopic 3D images as well as passive linear polarized viewing-glasses for use therewith.

BACKGROUND ART

Stereoscopic three-dimensional (3D) projection systems have been used for many years. One technology known-to-the-art and described for example in U.S. Pat. No. 7,528,906 dated Jun. 14, 2006 and entitled "Achromatic Polarization Switches", describes how a polarization modulator can be placed in-front of a single-lens projector, such as a 3-chip DLP digital cinema projector or otherwise.

The projector is arranged to emit a single image-beam comprising a rapid succession of alternate left and right-eye images at high speeds of typically 144 hertz. The polarization modulator then imparts an optical polarization state to said images generated by said projector and more specifically said polarization modulator is operated in synchronization with said projector in order to arrange for all left-eye images to possess a first state of circular polarization and all right-eye images to possess a second state of circular polarization, wherein said first and second states of circular polarization are mutually orthogonal (i.e. they possess opposite senses of rotation, for example with said first state of circular polarization comprising clockwise or right-handed circular polarization and said second state of circular polarization comprising anti-clockwise or left-handed circular polarization).

Thereafter, said left and right-eye images are focused onto the surface of a polarization-preserving projection-screen such as a silver-screen or otherwise, thereby enabling the viewing of time-multiplexed stereoscopic 3D images on the surface of said projection-screen via utilization of passive circular polarized viewing-glasses.

It will be known to one skilled-in-the-art that the utilization of passive circular polarized viewing-glasses enables the viewer to tilt their head without there being a significant reduction in the optical performance of said stereoscopic 3D projection system thereof. Furthermore, it will also be known to one skilled-in-the-art that passive circular polarized viewing-glasses typically comprise a first and second lens, wherein each of said lenses further comprise a linear polarizer together with an optical quarter-wave plate (QWP) such as a uniaxially stretched retardation film with in-plane value substantially equal to 140 nanometers or otherwise bonded to the front surface (i.e. input surface) of said linear polarizer according to the prior-art. The input surface is defined as being the surface for which light enters into an optical component, whereas the exit surface is defined as being the surface for which light exits from said optical component thereto.

Moreover, the optical retardation present in said quarter-wave plate composing said circular polarized viewing-glasses is typically arranged to mutually compensate for the optical retardation present in said polarization modulator for substantially all wavelengths of visible light, thereby providing for a high level of optical contrast and reducing the occurrence of cross-talk or ghosting. It is therefore for these reasons the majority of passive stereoscopic 3D projection systems currently on the market are based on circular polarization according to the prior-art.

Furthermore, it will be known to one skilled-in-the-art that said polarization modulator may comprise at least one or more liquid crystal elements stacked together in order to achieve the required electro-optical switching characteristics. One technology known-to-the-art for achieving this phenomenon and described for example in U.S. Pat. No. 4,792,850 dated Nov. 25, 1987 and entitled "Method and system employing a push-pull liquid crystal modulator", and again in U.S. Pat. No. 7,760,157 dated Jan. 9, 2009 and entitled "Enhanced ZScreen modulator techniques", describes how said polarization modulator may comprise a first and second pi-cell liquid crystal element (also commonly referred to as Optically Compensated Bend or OCB liquid crystal elements) stacked together in mutually crossed orientation such that the surface molecular alignment directors in said first pi-cell liquid crystal element are aligned substantially perpendicular to the surface molecular alignment directors in said second pi-cell liquid crystal element thereof. Pi-cell liquid crystal elements are known-to-the-art and characterized by their surface molecular alignment directors on both substrates being aligned mutually parallel. Therefore, in at least one optical-state the liquid crystal materials composing said pi-cell liquid crystal element form a helical structure between said substrates with an overall twist of 180 degrees (i.e. pi or 7C radians). A detailed description of the design and function of pi-cell liquid crystal elements can be found elsewhere in the literature according to the prior-art.

Moreover, each pi-cell liquid crystal element can for example be rapidly switched between a first optical-state possessing an optical retardation value that is substantially equal to zero when driven with high voltage (eg. 25 volt) in order to switch said liquid crystal materials to the homeotropic texture, and a second optical-state possessing an in-plane optical retardation value that is substantially equal to 140 nanometers when driven with low voltage (eg. 3 volt) in order to switch said liquid crystal materials to the splay texture (also commonly referred to as the bend texture). The splay texture is characterized by the molecular axes for said liquid crystal materials being aligned substantially parallel with the surfaces of said substrates as well as the helical twist within said liquid crystal materials being predominantly equal to zero, whereas the homeotropic texture is characterized by said molecular axes for said liquid crystal materials being aligned predominantly perpendicular to the surfaces of said substrates thereof. Furthermore, said pi-cell liquid crystal elements are capable of being rapidly switched between said first and second optical-states within a time period of typically less than 250 microseconds and are therefore often used when designing polarization modulators according to the prior-art.

It will also be known to one skilled-in-the-art that when said pi-cell liquid crystal element is switched to said splay texture possessing an in-plane optical retardation value substantially equal to 140 nanometers, then said pi-cell liquid crystal element will be a quarter-wave plate for the central part of the visible wavelength spectrum and will therefore transform incident linearly polarized visible light into circular polarization. Therefore, by stacking together two individual pi-cell liquid crystal elements in mutually crossed orientation together with a linear polarizer located in close proximity to the input surface of said stack of pi-cell liquid crystal elements in order to first convert the initially randomly polarized (i.e. unpolarized) incident light emitted by said projector into linear polarization, then the images generated by said projector can be rapidly modulated between left and right circular polarization states according to the state-of-the-art by operating said pi-cell liquid crystal elements mutually out-of-phase. Specifically, when said first pi-cell liquid crystal element is operated with high voltage (i.e. liquid crystal materials are switched to the homeotropic texture) then said second pi-cell liquid crystal element is simultaneously operated with low voltage (i.e. liquid crystal materials are switched to the splay texture), and vice versa according to the prior-art.

However, since the images generated by a typical 3-chip DLP digital cinema projector are initially randomly polarized, then it will be known to one skilled-in-the-art that said linear polarizer located in close proximity to the input surface of said polarization modulator will absorb approximately 50% of the incident light emitted by said projector thereof. This will therefore result in there being a significant reduction in the overall optical light efficiency for the aforementioned system based on a single image-beam design, thereby resulting in the creation of time-multiplexed stereoscopic 3D images according to the prior-art that are severely lacking in on-screen image brightness.

One technology known-to-the-art for increasing the overall optical light efficiency of a stereoscopic 3D projection system and described for example in U.S. Pat. No. 8,220,934 dated Sep. 29, 2006 and entitled "Polarization conversion systems for stereoscopic projection", and again in U.S. Pat. No. 7,857,455 dated Oct. 18, 2006 and entitled "Combining P and S rays for bright stereoscopic projection", uses a polarization beam-splitting (PBS) element in order to separate the incoming randomly polarized incident image-beam emitted by a single-lens projector into one transmitted image-beam propagating in the same direction as said incident image-beam and possessing a first state of linear polarization (eg. P-type linear polarization), and one reflected image-beam propagating in a perpendicular direction relative to said incident image-beam and possessing a second state of linear polarization (eg. S-type linear polarization), wherein said first and second states of linear polarization are mutually orthogonal.

Thereafter, a reflecting surface such as a mirror or otherwise is used to deflect the optical-path for said reflected image-beam towards the surface of a polarization-preserving projection-screen, thereby enabling both said transmitted and reflected image-beams to be arranged to mutually overlap by a substantial extent on the surface of said projection-screen thereof. This double image-beam design therefore enables both linear polarization components composing said original incident image-beam emitted by said projector to be used in order to recreate the overall on-screen image, thereby increasing the resulting image brightness according to the prior-art.

Additionally, a polarization rotator (i.e. a static optical element) is typically required in order to rotate the linear polarization state of said reflected image-beam by substantially 90 degrees and ensure that both said transmitted and reflected image-beams thereafter possess the same linear state of polarization. Furthermore, one or more polarization modulators are then used and operated in synchronization with said projector in order to arrange for all left-eye images emitted by said projector to possess a first state of circular polarization when reaching the surface of said projection-screen, and all right-eye images emitted by said projector to possess a second state of circular polarization when reaching the surface of said projection-screen, wherein said first and second states of circular polarization are mutually orthogonal. This therefore enables the viewer to perceive a time-multiplexed stereoscopic 3D image on the surface of said projection-screen via utilization of passive circular polarized viewing-glasses according to the prior-art.

It will also be understood by one skilled-in-the-art that by using passive circular polarized viewing-glasses, then the quarter-wave plate typically present in each of said lenses composing said circular polarized viewing-glasses can be arranged to mutually compensate for the optical retardation present in at least one of said polarization modulators for substantially all wavelengths of visible light, thereby providing for a high level of optical contrast and reducing the occurrence of cross-talk or ghosting according to the prior-art.

An alternative system for the displaying of high brightness stereoscopic 3D images according to the state-of-the-art is described for example in U.S. Pat. No. 9,958,697 dated Apr. 2, 2013 and entitled "Stereoscopic image apparatus", and again in both U.S. Pat. No. 9,740,017 dated May 29, 2013 and entitled "Optical polarization device for a stereoscopic image projector" and U.S. Pat. No. 9,594,255 dated Jun. 25, 2015 and entitled "Stereoscopic 3D projection system with improved level of optical light efficiency". Here, a polarization beam-splitting element is used to separate the randomly polarized incident image-beam generated by a single-lens projector into one transmitted image-beam propagating in the same direction as said incident image-beam and possessing a first state of linear polarization (eg. P-type linear polarization), and two reflected image-beams propagating in mutually opposite directions that are also both substantially perpendicular to said incident image-beam and with each of said reflected image-beams possessing a second state of linear polarization (eg. S-type linear polarization), wherein said first and second states of linear polarization are mutually orthogonal.

Thereafter, reflecting surfaces such as mirrors or otherwise are used to deflect the optical-paths for each of said reflected image-beams towards a polarization-preserving projection-screen and arranged such that said transmitted and reflected image-beams at least partially overlap in order to mutually combine and recreate a complete image on the surface of said projection-screen thereof. This triple image-beam design therefore enables both linear polarization components composing said original incident image-beam emitted by said projector to be used in order to recreate the overall on-screen image, thereby resulting in a higher level of image brightness as compared to the aforementioned single image-beam design according to the prior-art.

Additionally, polarization modulators are placed within the optical-paths for each of said transmitted and reflected image-beams and operated so as to modulate the polarization states for said image-beams in synchronization with the images generated by said projector. Specifically, said polarization modulators are arranged to ensure that all left-eye images emitted by said projector possess a first state of circular polarization when reaching said projection-screen, and all right-eye images emitted by said projector possess a second state of circular polarization when reaching said projection-screen, wherein said first and second states of circular polarization are mutually orthogonal. This therefore enables a time-multiplexed stereoscopic 3D image to be viewed on the surface of said projection-screen via utilization of passive circular polarized viewing-glasses according to the prior-art.

Moreover, it will once again be known to one skilled-in-the-art that the use of passive circular polarized viewing-glasses ensures for a high level of optical contrast (thereby providing a low level of cross-talk or ghosting) since the quarter-wave plate typically present in each of said lenses composing said passive circular polarized viewing-glasses can be arranged to mutually compensate for the optical retardation present in at least one of said polarization modulators for substantially all wavelengths of visible light. Furthermore, the use of passive circular polarized viewing-glasses also allows the viewer to tilt their head without there being a significant reduction in the overall optical performance of said stereoscopic 3D system thereof. It is therefore for these reasons the majority of high brightness stereoscopic 3D systems currently on the market utilize passive circular polarized viewing-glasses according to the prior-art.

BRIEF SUMMARY OF THE INVENTION

In one aspect, a polarization conversion system is provided to be used together with a single-lens projector for the displaying of a time-multiplexed stereoscopic 3D image when using passive linear polarized viewing-glasses. In another aspect, a polarization conversion system is provided for the displaying of time-multiplexed stereoscopic 3D images possessing both a high level of on-screen image brightness as well as a low level of cross-talk or ghosting. In yet another aspect, passive linear polarized viewing-glasses are provided for use together with said polarization conversion system therewith.

In some embodiments, passive linear polarized viewing-glasses including a first and second lens are provided, wherein each of the lenses includes a linear polarizer. In some embodiments, the passive linear polarized viewing-glasses also include an additional half-wave plate (HWP) for at least a portion of the visible wavelength spectrum. In some embodiments, the HWP can include an optical retardation film located in close proximity to the front surface (i.e. input surface) for one of said lenses.

In some embodiments, a polarization conversion system is provided. The polarization conversion system includes at least one polarization modulator. The polarization modulator includes at least two pi-cell liquid crystal elements. Each pi-cell liquid crystal element becomes a quarter-wave plate for at least a portion of the visible wavelength spectrum when the liquid crystal materials composing said pi-cell liquid crystal element are switched to the splay texture. The polarization conversion system also includes an additional quarter-wave plate such as an optical retardation film or otherwise located in close proximity to at least one of said pi-cell liquid crystal elements.

In some embodiments, the half-wave plate composing one of the lenses for said passive linear polarized viewing-glasses is configured to optically compensate for the summation of optical retardation present in at least one of said pi-cell liquid crystal elements and said quarter-wave plate composing said polarization modulator thereof. In some embodiments, the combined use of said passive linear polarized viewing-glasses together with said polarization conversion system enables a time-multiplexed stereoscopic 3D image with a high level of optical contrast to be viewed on the surface of a polarization-preserving projection-screen.

BRIEF DESCRIPTION OF THE FIGURES

The present invention may be better understood and its objectives and advantages will become apparent to one skilled-in-the-art by reference to the accompanying drawings, wherein like reference numerals refer to like elements in several of the figures.

DETAILED DESCRIPTION OF THE INVENTION

Figure 1:
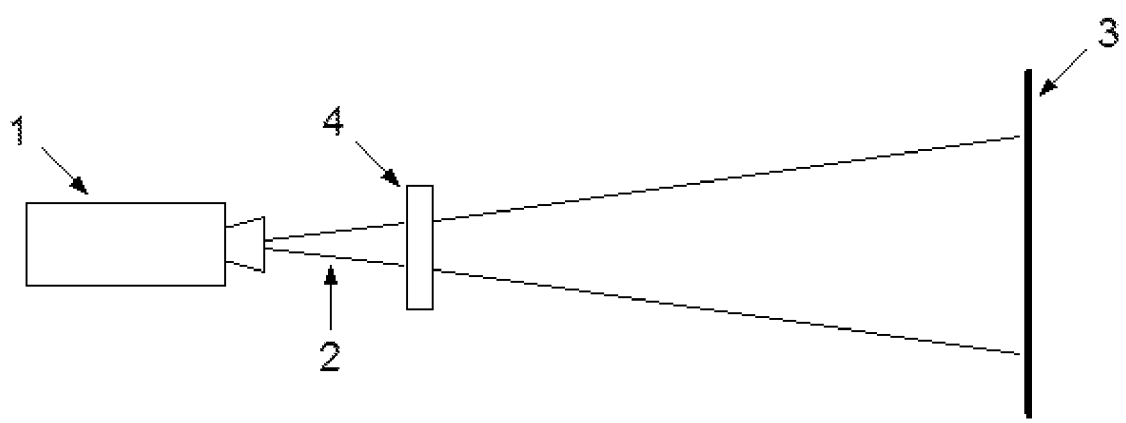
FIG. 1 is a schematic view of a time-multiplexed stereoscopic 3D projection system having a single image-beam design according to the prior-art.

FIG. 1 shows a stereoscopic 3D projection system based on a single image-beam design according to the state-of-the-art where a polarization modulator 4 comprising a stack of at least two liquid crystal elements (not shown) is placed directly in front of the lens of a projector 1, such as a 3-chip DLP digital cinema projector or otherwise.

The projector 1 generates an incident image-beam 2 comprising a rapid succession of alternate left and right-eye images at high frequency of typically 144 hertz and said polarization modulator 4 is arranged to impart a first circular polarization state to all left-eye images and a second circular polarization state to all right-eye images, wherein said first and second circular polarization states are mutually orthogonal. Thereafter, said left and right-eye images are focused onto the surface of a polarization-preserving projection-screen 3 such as a silver-screen or otherwise, thereby enabling a time-multiplexed stereoscopic 3D image to be viewed on the surface of said projection-screen via utilization of passive circular polarized viewing-glasses (not shown).

Furthermore, since typical projectors currently on the market such as 3-chip DLP digital cinema projectors generate images that are initially randomly polarized, it will be known to one skilled-in-the-art that a linear polarizer (not shown) is typically required to be located in close proximity to the input surface of said polarization modulator 4 thereof. Linear polarizers are known-to-the-art and typically comprise of thin sheets of transparent material containing absorptive dyes that are arranged to absorb specific components of polarization, thereby resulting in the transmitted light becoming linearly polarized. Moreover, the direction of the electrical-field vector for said linearly polarized light transmitted through said linear polarizer is defined as being the transmission axis for said linear polarizer thereof.

Additionally, said polarization modulator 4 typically comprises a stack of at least two pi-cell liquid crystal elements (not shown) arranged in mutually crossed orientation. Furthermore, said pi-cell liquid crystal elements can for example be rapidly switched between a first optical-state having substantially zero optical retardation when driven with high voltage (eg. 25 volt), and a second optical-state possessing an in-plane optical retardation value substantially equal to 140 nanometers when driven with low voltage (eg. 3 volt) according to the prior-art.

Moreover, when the optical retardation present in one of said pi-cell liquid crystal elements is substantially equal to 140 nanometers, then said pi-cell liquid crystal element will become a quarter-wave plate for the central part of the visible wavelength spectrum and will therefore transform visible incident light that is initially linearly polarized into circular polarization. Furthermore, by operating said pi-cell liquid crystal elements mutually out-of-phase such that when said first pi-cell liquid crystal element is operated with high voltage then said second pi-cell liquid crystal element is simultaneously operated with low voltage and vice versa, said polarization modulator 4 can be arranged to rapidly modulate the polarization state of said incident image-beam 2 between a left and right circular polarization state, thereby enabling a time-multiplexed stereoscopic 3D image to be viewed on the surface of said projection-screen 3 via utilization of passive circular polarized viewing-glasses according to the prior-art.

However, it will be known to one skilled-in-the-art that since the incident image-beam 2 emitted by said projector 1 is typically randomly polarized, then said linear polarizer (not shown) located in close proximity to the input surface of said polarization modulator 4 will absorb approximately 50% of the emitted light, thereby creating stereoscopic 3D images that are severely lacking in on-screen image-brightness according to the aforementioned prior-art technology.

Figure 2:
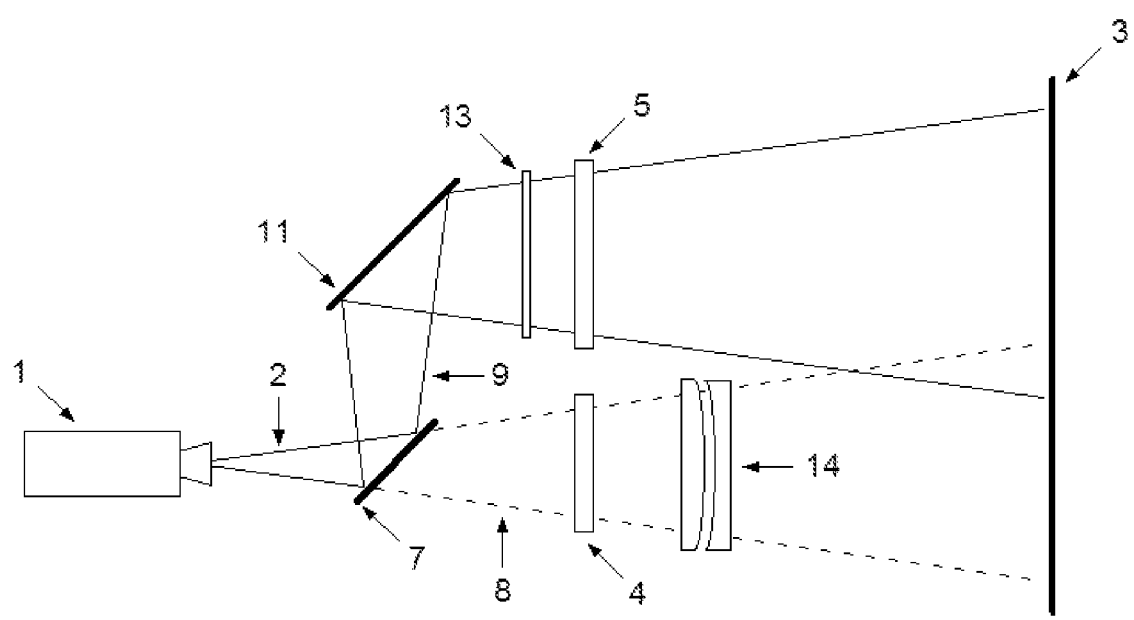
FIG. 2 is a schematic view of a time-multiplexed stereoscopic 3D projection system having a double image-beam design according to the prior-art.

FIG. 2 shows an alternative stereoscopic 3D projection system comprising a double image-beam design according to the state-of-the-art. Here, a projector 1 emits an incident image-beam 2 comprising a rapid succession of alternate left and right-eye images at high frequency of typically 144 hertz. The incident image-beam 2 then impinges on a polarization beam-splitting element 7 and said polarization beam-splitting element generates one transmitted image-beam 8 propagating in the same direction as said incident image-beam 2 and possessing a first state of linear polarization (eg. P-type linear polarization), and one reflected image-beam 9 propagating in a perpendicular direction relative to said incident image-beam 2 and possessing a second state of linear polarization (eg. S-type linear polarization), wherein said first and second states of linear polarization are mutually orthogonal.

There is also provided a reflecting surface 11 such as a silver-mirror or otherwise, which is arranged to deflect the optical-path for said reflected image-beam 9 towards a polarization-preserving projection-screen 3, such as a silver-screen or otherwise. The images generated on the surface of said projection-screen by said transmitted and reflected image-beams 8, 9 thereof are then arranged to mutually overlap by a substantial extent in order to recreate a complete image on the surface of said projection-screen thereof. This therefore enables both linear polarization components composing said original incident image-beam 2 to be used in order to recreate the overall on-screen image, thereby resulting in a higher level of image brightness as compared to the aforementioned single image-beam design according to the prior-art.

Additionally, a polarization rotator 13 is typically located within the optical-path for said reflected image-beam 9 and arranged so as to transform the linear polarization state of said reflected image-beam 9 to that for said transmitted image-beam 8, thereby ensuring that both said transmitted and reflected image-beams 8, 9 thereafter possess the same state of linear polarization. Furthermore, one or more polarization modulators 4, 5 are then used to rapidly modulate the state of polarization for each of said transmitted and reflected image-beams 8, 9 thereof between a left and right circular polarization state in synchronization with the images generated by said projector 1. Specifically, said polarization modulators 4, 5 are arranged to ensure that all left-eye images reaching the surface of said projection-screen 3 possess a first state of circular polarization, and all right-eye images reaching the surface of said projection-screen possess a second state of circular polarization, wherein said first and second states of circular polarization are mutually orthogonal. This therefore enables a time-multiplexed stereoscopic 3D image to be viewed on the surface of said projection-screen 3 via utilization of passive circular polarized viewing-glasses (not shown) according to the prior-art. There may or may not also be an additional telephoto-lens pair 14 located within the optical-path for said transmitted image-beam 8 and arranged in order to at least partially compensate for the difference in optical-path lengths for said transmitted and reflected image-beams 8, 9 thereof.

Moreover, it will be known to one skilled-in-the-art that said polarization modulators 4, 5 each typically comprise a stack of two pi-cell liquid crystal elements (not shown) aligned in mutually crossed orientation. Furthermore, each of said pi-cell liquid crystal elements is typically designed to be able to transform incident linearly polarized visible light into circular polarization. Additionally, by operating said pi-cell liquid crystal elements mutually out-of-phase such that when said first pi-cell liquid crystal element is operated with high voltage then said second pi-cell liquid crystal element is simultaneously operated with low voltage and vice versa, then it will be known to one skilled-in-the-art that said polarization modulators 4, 5 may be arranged to rapidly modulate the polarization state for each of said image-beams 8, 9 thereof between a left and right circular polarization state according to the prior-art.

Figure 3:
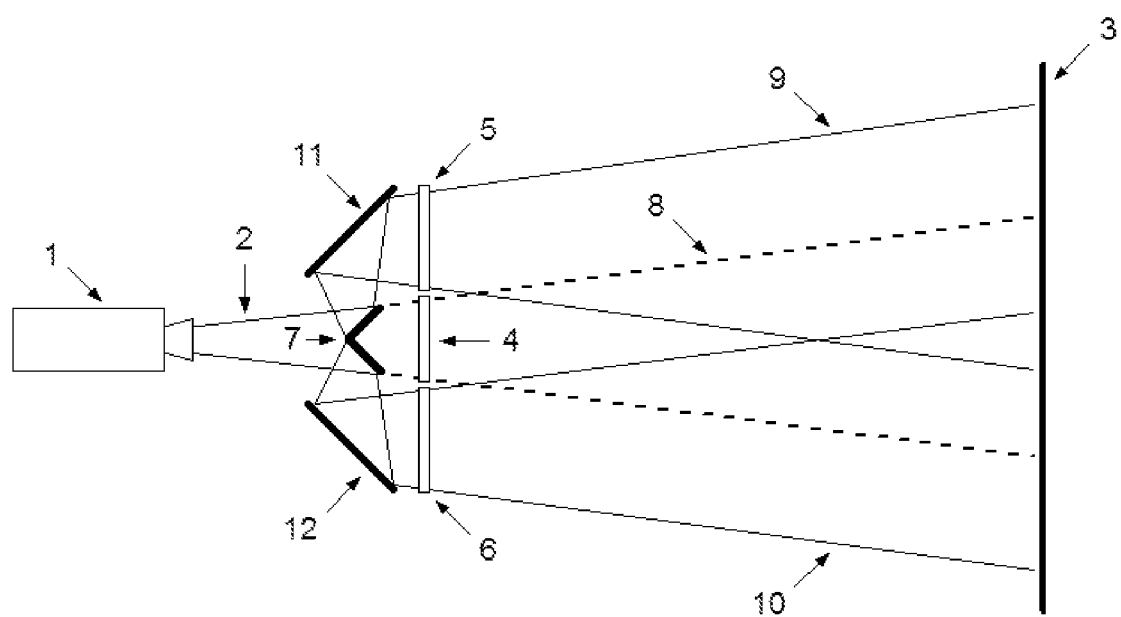
FIG. 3 is a schematic view of a time-multiplexed stereoscopic 3D projection system having a triple image-beam design according to the prior-art.

FIG. 3 shows an alternative time-multiplexed stereoscopic 3D projection system based on a triple image-beam design according to the state-of-the-art. Here, a polarization beam-splitting element 7 is used to separate the randomly polarized incident image-beam 2 emitted by a single-lens projector 1 into one transmitted image-beam 8 propagating in the same direction as said incident image-beam 2 and possessing a first state of linear polarization (eg. P-type linear polarization), and two reflected image-beams 9, 10 propagating in mutually opposite directions that are both substantially perpendicular to said incident image-beam 2 and possessing a second state of linear polarization (eg. S-type linear polarization), wherein said first and second linear polarization states are mutually orthogonal.

Thereafter, reflecting surfaces 11, 12 such as silver-mirrors or otherwise are used to deflect the optical-paths for each of said reflected image-beams 9, 10 towards a polarization-preserving projection-screen 3 and arranged such that said transmitted and reflected image-beams 8, 9, 10 at least partially overlap in order to mutually combine and recreate a complete image on the surface of said projection-screen thereof. Such triple image-beam designs therefore enable both linear polarization components composing said original incident image-beam 2 to be used in order to recreate the overall on-screen image, thereby resulting in a higher level of image brightness as compared to the aforementioned single image-beam design according to the prior-art.

Furthermore, polarization modulators 4, 5, 6 are then respectively placed within the optical-paths for each of said transmitted and reflected image-beams 8, 9, 10 thereof and operated so as to modulate the polarization states for said image-beams in synchronization with the images generated by said projector 1. Moreover, said polarization modulators 4, 5, 6 each typically comprise a stack of two individual pi-cell liquid crystal elements (not shown) aligned in mutually crossed orientation and operated so as to rapidly modulate the linear polarization states for said transmitted and reflected image-beams 8, 9, 10 thereof between a left and right circular polarization state in synchronization with the images generated by said projector 1. Specifically, it is arranged such that all left-eye images reaching the surface of said projection-screen 3 possess a first state of circular polarization, and all right-eye images reaching the surface of said projection-screen possess a second state of circular polarization, wherein said first and second states of circular polarization are mutually orthogonal. This therefore enables a time-multiplexed stereoscopic 3D image to be viewed on the surface of said projection-screen 3 via utilization of passive circular polarized viewing-glasses (not shown) according to the prior-art.

Figure 4:
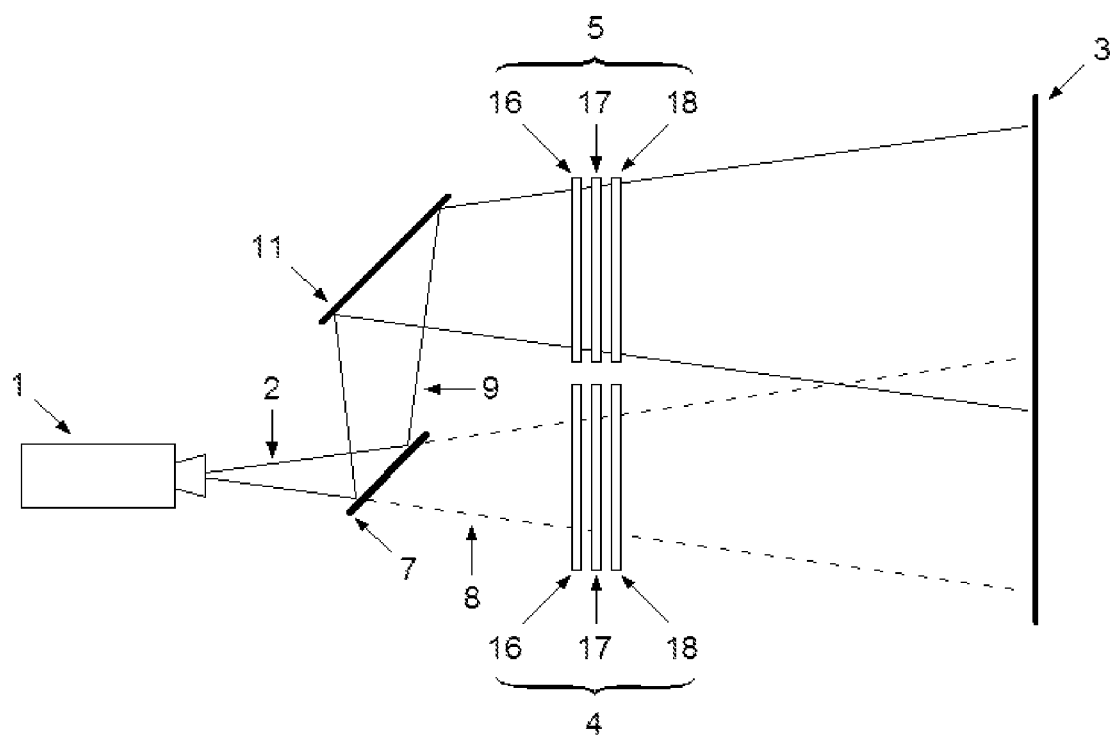
FIG. 4 is a schematic view of a polarization conversion system to be used together with a single-lens projector and passive linear polarized viewing-glasses (not shown) in accordance with various embodiments of the present invention.

FIG. 4 discloses a preferred embodiment of the present invention. Here, there is provided a single-lens projector 1 arranged to emit an incident image-beam 2 comprising a rapid succession of alternate left and right-eye images at high speeds of typically 144 hertz. A polarization beam-splitting element 7 such as but not limited to one of a Wire-Grid-Polarizer (WGP) and multi-layer stack of optical coatings then separates said incident image-beam 2 into one transmitted image-beam 8 traveling in substantially the same direction as said incident image-beam 2 and possessing a first state of linear polarization, and at least one reflected image-beam 9 traveling in a direction that is substantially perpendicular to said incident image-beam 2 and possessing a second state of linear polarization, wherein said first and second states of linear polarization are substantially mutually orthogonal.

There is also provided a reflecting surface 11 such as a mirror or otherwise that is configured to deflect the optical-path for said reflected image-beam 9 towards the surface of a polarization-preserving projection-screen 3 such as a silver-screen or otherwise. Furthermore, said transmitted and reflected image-beams 8, 9 are arranged to mutually overlap by a substantial extent on the surface of said projection-screen thereof. This therefore enables both linear polarization components composing said original incident image-beam 2 to be used in order to recreate a complete image on the surface of said projection-screen thereof, thereby resulting in a high level of on-screen image-brightness. There may also be provided an optional telephoto-lens pair (not shown) or alternatively at least one cylindrical lens (not shown) located within the optical-path for at least one of said transmitted and reflected image-beams 8, 9 and arranged to at least partially compensate for the difference in optical-path lengths for said transmitted and reflected image-beams 8, 9 thereof.

Additionally, there is also provided a first polarization modulator 4 placed within the optical-path for said transmitted image-beam 8 and a second polarization modulator 5 placed within the optical-path for said reflected image-beam 9 thereto. Moreover, each of said first and second polarization modulators 4, 5 further comprise a first pi-cell liquid crystal element 16 and a second pi-cell liquid crystal element 17 placed in mutually crossed orientation such that the surface molecular alignment directors (not shown) for said first pi-cell liquid crystal element are aligned substantially perpendicular to the surface molecular alignment directors (not shown) for said second pi-cell liquid crystal element thereof. Furthermore, each of said first and second pi-cell liquid crystal elements are arranged to be a quarter-wave plate for at least part of the visible wavelength spectrum when the liquid crystal materials composing said pi-cell liquid crystal element are switched to the splay texture.

There is also provided a quarter-wave plate 18 located in close proximity to at least one of said first and second pi-cell liquid crystal elements 16, 17 composing each of said first and second polarization modulators 4, 5 thereof. Moreover, the optical axis for said quarter-wave plate 18 is arranged to be substantially parallel with the surface molecular alignment directors for one of said first and second pi-cell liquid crystal elements 16, 17 thereto. The optical axis for any element that possesses optical retardation is defined as being the direction in which the electrical-field vector for linearly polarized light must be aligned in order for said linearly polarized light to be transmitted through said element without undergoing any optical retardation.

Additionally, there may also be provided an optional clean-up linear polarizer (not shown) located in close proximity to the input surface for at least one of said first and second polarization modulators 4, 5 and arranged to improve the level of linear polarization for light entering into said polarization modulator thereof. In other embodiments of the present invention, said first and second polarization modulators 4, 5 may alternatively be mutually joined together along a common edge in order to form one larger polarization modulator that simultaneously modulates the polarization states for both said transmitted and reflected image-beams thereto. There may or may not also be provided a stack of optical-films (not shown) such as in-plane retardation films or otherwise located in close proximity to the exit surface of at least one of said first and second polarization modulators and arranged to improve the level of optical contrast generated by said polarization modulator thereof.

Furthermore, said first and second polarization modulators 4, 5 are arranged to be rapidly switched between a first and second optical-state in synchronization with the images emitted by said projector 1. Specifically, said polarization modulators are arranged to impart a first output linear polarization state to all left-eye images reaching the surface of said projection-screen 3 and a second output linear polarization state to all right-eye images reaching the surface of said projection-screen, wherein said first and second output linear polarization states are substantially mutually orthogonal. This therefore enables a time-multiplexed stereoscopic 3D image to be viewed on the surface of said projection-screen via utilization of suitable passive linear polarized viewing-glasses (not shown) according to the objectives of the present invention.

Figure 5:
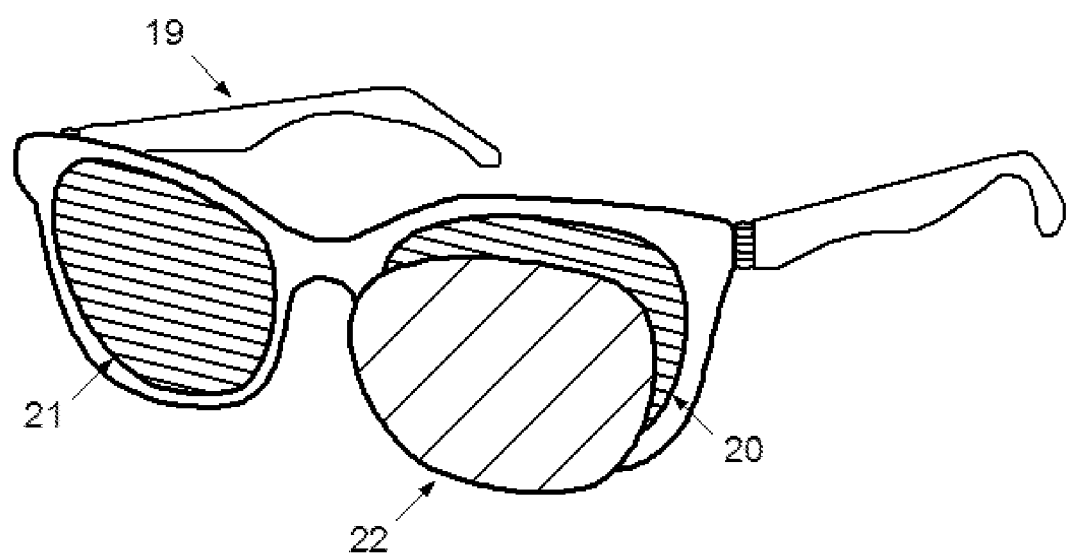
FIG. 5 is a partially exploded perspective view of passive linear polarized viewing-glasses in accordance with various embodiments of the present invention.

FIG. 5 discloses the design of suitable passive linear polarized viewing-glasses for the viewing of said time-multiplexed stereoscopic 3D images according to a further embodiment of the present invention. Here, said passive linear polarized viewing-glasses 19 comprise a first lens having a first linear polarizer 20 and a second lens having a second linear polarizer 21, wherein the transmission axes for said first and second linear polarizers are arranged to be substantially mutually parallel. There is also provided a half-wave plate 22 located in close proximity to the input surface (i.e. front surface) for one of said first and second linear polarizers and arranged such that the angle between the optical axis for said half-wave plate and the transmission axis for at least one of said linear polarizers is substantially equal to 45 degrees. Moreover, in a first preferred embodiment of the present invention the transmission axes for each of said first and second linear polarizers 20, 21 are arranged to be substantially aligned in a horizontal direction and furthermore the optical axis for said half-wave plate 22 is arranged to be aligned at an angle of substantially 45 degrees relative to said horizontal direction thereof.

It will be understood by one skilled-in-the-art that since said first and second pi-cell liquid crystal elements 16, 17 composing each of said first and second polarization modulators 4, 5 are aligned such that the surface molecular alignment directors for said first pi-cell liquid crystal element 16 are substantially perpendicular to the surface molecular alignment directors for said second pi-cell liquid crystal element 17 thereof, then said first and second pi-cell liquid crystal elements shall be operated mutually out-of-phase in order to switch said polarization modulator between said first and second optical-states. Specifically, when said first pi-cell liquid crystal element 16 is operated with low voltage (i.e. liquid crystal materials composing said first pi-cell are switched to the splay texture) then said second pi-cell liquid crystal element 17 is simultaneously operated with high voltage (i.e. liquid crystal materials composing said second pi-cell are switched to the homeotropic texture) in order to switch said polarization modulator to said first optical-state. Moreover, when instead said first pi-cell liquid crystal element 16 is operated with high voltage and said second pi-cell liquid crystal element 17 is simultaneously operated with low voltage, then in this case said polarization modulator will be switched to said second optical-state thereof. This therefore enables said polarization modulator to be rapidly switched between said first and second optical-states in synchronization with the images emitted by said projector 1 in accordance with the teachings of the present invention.

Furthermore, it will be understood by one skilled-in-the-art that when one of said first and second polarization modulators 4, 5 is switched to said first optical-state wherein said first pi-cell liquid crystal element 16 is operated with low voltage and said second pi-cell liquid crystal element 17 is simultaneously operated with high voltage, and additionally if the optical axis for said quarter-wave plate 18 is also arranged to be substantially perpendicular to the surface molecular alignment directors for said first pi-cell liquid crystal element 16 thereof, then the optical retardation for said quarter-wave plate 18 can be arranged to mutually compensate for the optical retardation present in said first pi-cell liquid crystal element 16 for substantially all wavelengths of visible light, hence linearly polarized light will in this case pass through said polarization modulator substantially unchanged. Moreover, for this first criterion to occur the magnitude of the in-plane optical retardation present in said first pi-cell liquid crystal element 16 must be substantially equal to the magnitude of the in-plane optical retardation present in said quarter-wave plate 18, and furthermore the optical axis for said in-plane optical retardation present in said first pi-cell liquid crystal element 16 must also be aligned substantially perpendicular to the optical axis for said in-plane retardation present in said quarter-wave plate 18 thereof.

Moreover, if instead said polarization modulator is switched to said second optical-state wherein said first pi-cell liquid crystal element 16 is operated with high voltage and said second pi-cell liquid crystal element 17 is simultaneously operated with low voltage, then the summation of the optical retardation for said second pi-cell liquid crystal element 17 and said quarter-wave plate 18 can be arranged to be substantially equal to a half-wave plate for at least a portion of the visible wavelength spectrum. In this case, the linear polarization state for light passing through said polarization modulator will thus be rotated by substantially 90 degrees. Furthermore, if the half-wave plate 22 present in one of said first and second lenses composing said passive linear polarized viewing-glasses 19 is arranged to mutually compensate for the summation of the retardation for said second pi-cell liquid crystal element 17 and said quarter-wave plate 18 thereof, then said polarization conversion system will in this case have a high level of optical contrast for all wavelengths of visible light in accordance with the objectives of the present invention. Moreover, for this second criterion to occur the summation of the magnitude of in-plane optical retardation present in both said second pi-cell liquid crystal element 17 and said quarter-wave plate 18 composing said polarization modulator must be substantially equal to the magnitude of the in-plane optical retardation present in said half-wave plate 22 composing said passive linear polarized viewing-glasses 19. Furthermore, the optical axis for the summation of in-plane optical retardation present in both said second pi-cell liquid crystal element 17 and said quarter-wave plate 18 must also be aligned substantially perpendicular to the optical axis for said in-plane optical retardation present in said half-wave plate 19 thereof.

The disclosed invention therefore enables time-multiplexed stereoscopic 3D images to be viewed on the surface of said projection-screen 3 that possess both a high level of on-screen image-brightness as well as a low level of cross-talk or ghosting via utilization of suitable passive linear polarized viewing-glasses 19 according to the teachings of the present invention.

Figure 6:
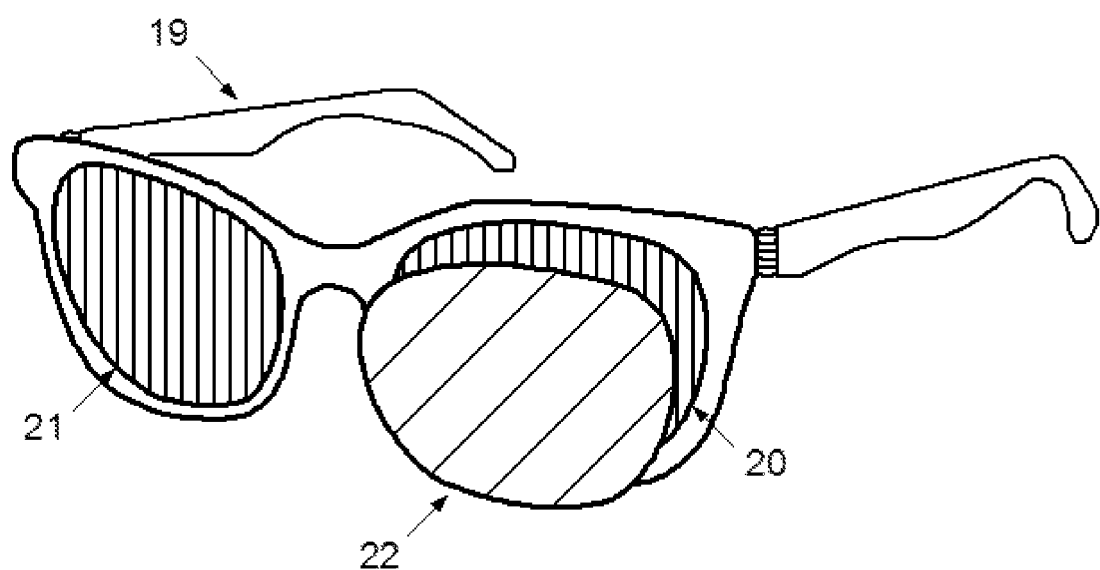
FIG. 6 is a partially exploded perspective view of alternative passive linear polarized viewing-glasses in accordance with various embodiments of the present invention.

FIG. 6 discloses a second preferred embodiment for the design of suitable passive linear polarized viewing-glasses according to the present invention. Here, passive linear polarized viewing-glasses 19 are provided that comprise a first lens having a first linear polarizer 20 and a second lens having a second linear polarizer 21, wherein the transmission axes for said first and second linear polarizers are both substantially aligned in a vertical direction. There is also provided a half-wave plate 22 located in close proximity to the input surface (i.e. front surface) for one of said first and second linear polarizers and arranged such that the optical axis for said half-wave plate is aligned at an angle of substantially 45 degrees relative to said vertical direction thereof.

It will be understood by one skilled-in-the-art that in order for the time-multiplexed stereoscopic 3D system according to the present invention to provide optimum performance, the following two criteria should preferably be fulfilled; (i) the magnitude of in-plane optical retardation present in one of said pi-cell liquid crystal elements 16, 17 when switched to the splay texture should be substantially equal to the magnitude of in-plane optical retardation present in said quarter-wave plate 18 composing one of said polarization modulators 4, 5 thereof, as well as the optical axis for said in-plane optical retardation present in said pi-cell liquid crystal element being aligned substantially perpendicular to the optical axis for said in-plane optical retardation present in said quarter-wave plate 18, and (ii) the summation of the magnitude of in-plane optical retardation for one of said pi-cell liquid crystal elements 16, 17 when switched to the splay texture and said quarter-wave plate 18 composing one of said polarization modulators 4, 5 should be substantially equal to the magnitude of in-plane optical retardation present in said half-wave plate 22 composing said passive linear polarized viewing-glasses 19, as well as the optical axis for the summation of in-plane optical retardation present in said pi-cell liquid crystal element and said quarter-wave plate 18 being aligned substantially perpendicular to the optical axis for said in-plane optical retardation present in said half-wave plate 19 thereto.

In a further preferred embodiment of the present invention, the value of the in-plane optical retardation present in said quarter-wave plate 18 composing one of said polarization modulators 4, 5 should preferably be in the interval between 100 nanometers and 180 nanometers, and more preferably said in-plane optical retardation should be substantially equal to 140 nanometers. Moreover, it is further disclosed that the in-plane optical retardation present in at least one of said pi-cell liquid crystal elements 16, 17 when switched to the splay texture should preferably be in the interval between 100 nanometers and 180 nanometers, and more preferably said in-plane optical retardation should be substantially equal to 140 nanometers. It is further disclosed that said quarter-wave plate 18 may preferably comprise a uniaxially stretched optical retardation film and furthermore said quarter-wave plate may preferably be bonded to the surface of at least one of said pi-cell liquid crystal elements 16, 17 using an optically clear adhesive or otherwise.

Moreover, it is further disclosed that said half-wave plate 22 composing said passive linear polarized viewing-glasses 19 may preferable have an in-plane optical retardation value in the interval between 200 nanometers and 360 nanometers, and more preferably said in-plane optical retardation should be substantially equal to 280 nanometers. Furthermore said half-wave plate 22 may comprise a uniaxially stretched optical retardation-film and moreover said half-wave plate may preferably be bonded to the input surface (i.e. front surface) for one of said linear polarizers 20, 21 composing said lenses which further compose said passive linear polarized viewing-glasses 19 thereof.

Although the disclosure of the present invention has been illustrated with reference to a double image-beam design, it will be understood by one-skilled-in-the-art that a triple image-beam design may also be used without departing from the inventive ideas disclosed herein. Here, the incident image-beam 2 is split by a polarization beam-splitting element 7 into one transmitted image-beam 8 propagating in the same direction as said incident image-beam 2 and possessing a first state of linear polarization, and two reflected image-beams 9, 10 propagating in mutually opposite directions which are also substantially orthogonal to the direction of said incident image-beam 2 and each possessing a second state of linear polarization, wherein said first and second states of linear polarization are mutually orthogonal. However, in this case the design of the polarization modulators and passive linear polarized viewing-glasses remains unchanged and in accordance with the teachings of the present invention.

Whilst preferred embodiments of the present invention have been shown and described herein, various modifications may be made thereto without departing from the inventive ideas of the present invention. Accordingly, it is to be understood that the present invention has been described by way of illustration and not limitation.

What is claimed is:

1. A polarization conversion system comprising:
   a polarization beam-splitting element configured to separate a randomly polarized incident image-beam emitted by a projector into:
   a transmitted image-beam possessing a first state of linear polarization, and
   at least one reflected image-beam possessing a second state of linear polarization wherein said first and second states of linear polarization are substantially mutually orthogonal;
   a reflective surface configured to deflect the optical-path for at least one of said transmitted or reflected image-beams towards a projection surface, said transmitted and reflected image-beams being arranged to at least partially overlap on said projection surface; and
   at least a first and second polarization modulator, respectively located within the optical-paths for each of said transmitted and reflected image-beams and arranged to modulate the polarization states of said transmitted and reflected image-beams between a first and second output linear polarization state in synchronization with the image-beam emitted by said projector, wherein the first and second output linear polarization states are substantially mutually orthogonal, each of said polarization modulators further comprising:
   at least a first and second pi-cell liquid crystal element aligned in a mutually crossed orientation wherein the surface molecular alignment directors for said first pi-cell liquid crystal element are aligned substantially perpendicular to the surface molecular alignment directors for said second pi-cell liquid crystal element, each of said pi-cell liquid crystal elements being switched between at least a first and second optical-state, at least one of said optical-states having an in-plane optical retardation value corresponding to a quarter-wave plate (QWP) for at least a portion of the visible wavelength spectrum, and
   there being provided a quarter-wave plate located in close proximity to at least one of said pi-cell liquid crystal elements, wherein the optical axis for the in-plane optical retardation for at least one of said pi-cell liquid crystal elements when switched to at least one of said optical-states is aligned substantially perpendicular to the optical axis for said quarter-wave plate.

2. The polarization conversion system of claim 1, wherein said projection surface is the surface of a polarization-preserving projection-screen.

3. The polarization conversion system of claim 2, wherein the polarization conversion system is operable together with passive linear polarized viewing-glasses in order to display a time-multiplexed stereoscopic 3D image on the surface of said polarization-preserving projection-screen.

4. The polarization conversion system of claim 1, wherein said quarter-wave plate is configured for providing in-plane optical retardation at wavelengths including at least part of the visible wavelength spectrum.

5. The polarization conversion system of claim 1, wherein the in-plane optical retardation value for at least one of said pi-cell liquid crystal elements when switched to at least one of said optical-states being in the interval between 100 nanometers and 180 nanometers.

6. The polarization conversion system of claim 5, wherein the in-plane optical retardation value for at least one of said pi-cell liquid crystal elements when switched to at least one of said optical-states being substantially equal to 140 nanometers.

7. The polarization conversion system of claim 1, wherein said quarter-wave plate having an in-plane optical retardation value in the interval between 100 nanometers and 180 nanometers.

8. The polarization conversion system of claim 7, wherein said quarter-wave plate having an in-plane optical retardation value substantially equal to 140 nanometers.

9. The polarization conversion system of claim 1, wherein said quarter-wave plate comprises a uniaxially stretched in-plane optical retardation film.

10. The polarization conversion system of claim 1, wherein the magnitude of in-plane optical retardation present in at least one of said pi-cell liquid crystal elements when switched to at least one of said optical-states being substantially equal to the magnitude of in-plane optical retardation present in said quarter-wave plate.

11. The polarization conversion system of claim 1, further comprising:
   A pair of passive linear polarized viewing-glasses comprising:
      a first lens having a first linear polarizer;
      a second lens having a second linear polarizer, wherein the transmission axis for said first linear polarizer is aligned substantially parallel with the transmission axis for said second linear polarizer;
      a half-wave plate located in close proximity to the input surface for one of said first or second linear polarizers; and
      wherein said half-wave plate is aligned such that the angle between the optical axis for said half-wave plate and the transmission axis for one of said first and second-linear polarizers is substantially equal to 45 degrees.

12. The passive linear polarized viewing-glasses of claim 11, wherein the mutually parallel aligned transmission axes for said first and second linear polarizers extend along one of a horizontal axis or a vertical axis.

13. The passive linear polarized viewing-glasses of claim 11, wherein said half-wave plate has an in-plane optical retardation value in the interval between 200 nanometers and 360 nanometers.

14. The passive linear polarized viewing-glasses of claim 13, wherein said half-wave plate has an in-plane optical retardation value substantially equal to 280 nm.

15. The passive linear polarized viewing-glasses of claim 11, wherein said half-wave plate includes a uniaxially stretched in-plane optical retardation film.

16. The passive linear polarized viewing-glasses of claim 11, wherein said half-wave plate is bonded to the input surface for one of said first or second linear polarizers.

17. The polarization conversion system of claim 1, further comprising:
   a pair of passive linear polarized viewing-glasses including:
      a first lens having a first linear polarizer;
      a second lens having a second linear polarizer, wherein the transmission axis for said first linear polarizer is aligned substantially parallel with the transmission axis for said second linear polarizer;
      a half-wave plate located in close proximity to the input surface for one of said first or second linear polarizers; and
      wherein said half-wave plate is aligned such that the angle between the optical axis for said half-wave plate and the transmission axis for one of said first and second-linear polarizers is substantially equal to 45 degrees,
   wherein the summation of the magnitude of the in-plane optical retardation for at least one of said pi-cell liquid crystal elements when switched to at least one of said optical-states and the magnitude of the in-plane optical retardation for said quarter-wave plate composing one of said polarization modulators is substantially equal to the magnitude of the in-plane optical retardation for said half-wave plate composing said passive linear polarized viewing-glasses.

18. The polarization conversion system of claim 1, further comprising:
   a pair of passive linear polarized viewing-glasses including:
      a first lens having a first linear polarizer;
      a second lens having a second linear polarizer, wherein the transmission axis for said first linear polarizer is aligned substantially parallel with the transmission axis for said second linear polarizer;
      a half-wave plate located in close proximity to the input surface for one of said first or second linear polarizers; and
      wherein said half-wave plate is aligned such that the angle between the optical axis for said half-wave plate and the transmission axis for one of said first and second-linear polarizers is substantially equal to 45 degrees,
   wherein the optical axis for the summation of the in-plane optical retardation for at least one of said pi-cell liquid crystal elements when switched to at least one of said optical-states and the in-plane optical retardation for said quarter-wave plate composing one of said polarization modulators is aligned substantially perpendicular to the optical axis for the in-plane optical retardation present in said half-wave plate composing said passive linear polarized viewing-glasses.

19. The polarization conversion system of claim 1, wherein said polarization beam-splitting element is configured to separate the randomly polarized incident image-beam into one transmitted image-beam possessing the first state of linear polarization and two reflected image-beams possessing the second state of linear polarization, wherein said first and second states of linear polarization are substantially mutually orthogonal.

* * * * *